United States Patent [19]

Mandall

[11] Patent Number: 5,491,992
[45] Date of Patent: Feb. 20, 1996

[54] KING PIN LOCKING MECHANISM

[76] Inventor: Michael C. Mandall, 5442 E. Cambridge, Phoenix, Ariz. 85018

[21] Appl. No.: 235,469

[22] Filed: Apr. 29, 1994

[51] Int. Cl.[6] ................................................. F16B 41/00
[52] U.S. Cl. .................... 70/232; 70/14; 70/417; 70/422
[58] Field of Search .................... 70/14, 19, 57, 70/58, 258, 237, 232, 422, 417, 416, 163–164, 166–169; 280/507

[56] References Cited

U.S. PATENT DOCUMENTS

| 3,587,080 | 6/1971 | Hawkins | 70/422 |
| 3,763,675 | 10/1973 | Hofmeister et al. | 70/232 |
| 3,798,938 | 3/1974 | McCullum | 70/232 |
| 3,922,897 | 12/1975 | Mickelson | 70/232 |
| 4,394,821 | 7/1983 | Best et al. | 70/422 |
| 4,397,165 | 8/1983 | LiCausi | 70/422 |
| 4,620,718 | 11/1986 | Mickelson | 70/232 |
| 4,697,444 | 10/1987 | Maffey | 70/232 |
| 4,704,883 | 11/1987 | Dykes | 70/232 |
| 4,724,691 | 2/1988 | Newman et al. | 70/422 |
| 5,195,339 | 3/1993 | Nee et al. | 70/14 |
| 5,343,720 | 9/1994 | Slater | 70/258 |

FOREIGN PATENT DOCUMENTS

| 27511 | of 1913 | United Kingdom | 70/417 |
| 883005 | 11/1961 | United Kingdom | 70/417 |
| 1451046 | 9/1976 | United Kingdom | 70/417 |

Primary Examiner—Darnell M. Boucher
Attorney, Agent, or Firm—Cahill, Sutton & Thomas

[57] ABSTRACT

A king pin locking mechanism employs a sliding locking bar in a housing for engaging a king pin. A key-activated cam moves dead bolts outwardly of the locking bar to lock that bar in the housing. Tampering forces applied to the cam deform a deformable member relocking the cam and dead bolts against unauthorized movement.

2 Claims, 3 Drawing Sheets

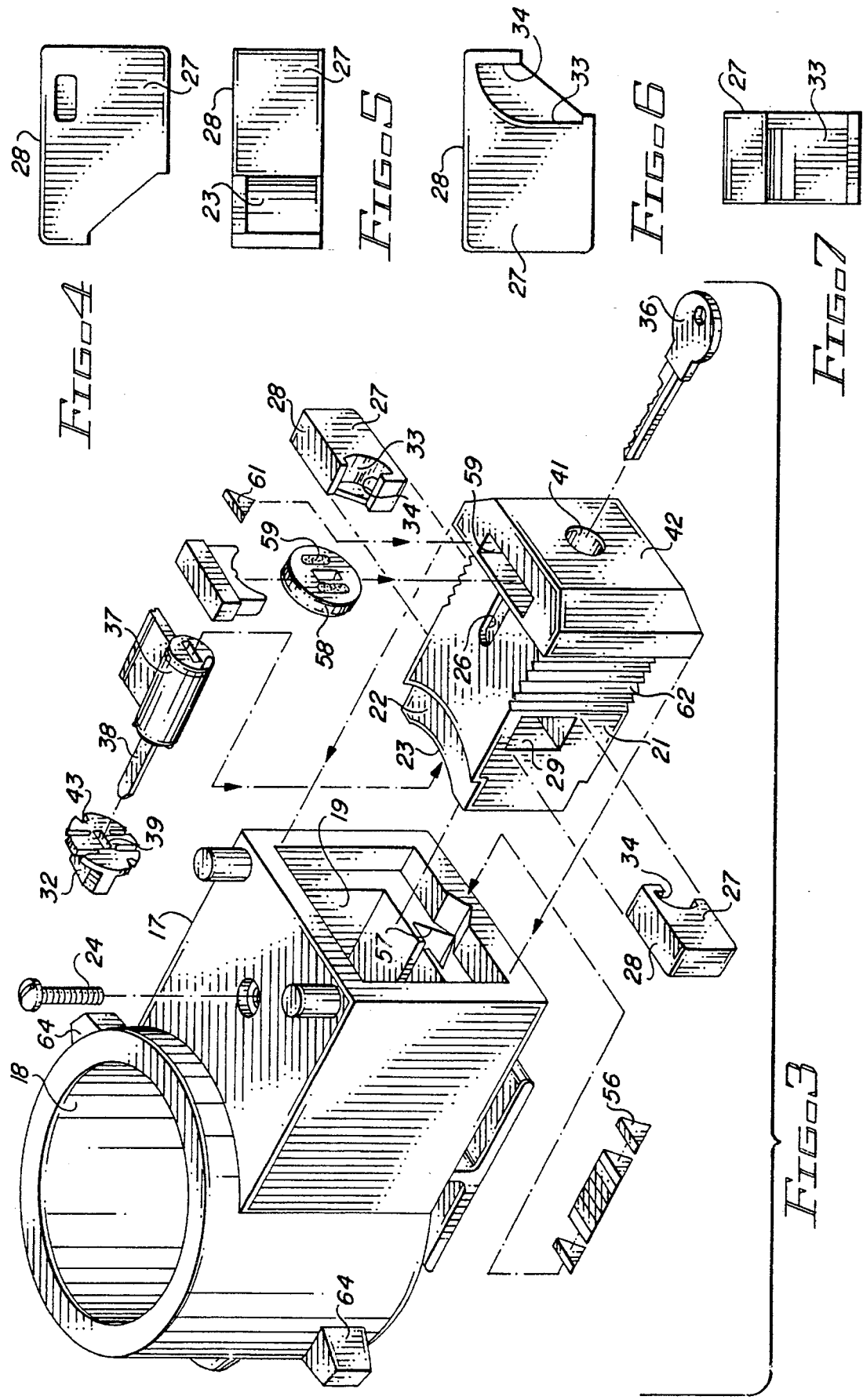

KING PIN LOCKING MECHANISM

TECHNICAL FIELD

This invention is concerned with the prevention of theft of semitrailers.

BACKGROUND ART

The theft of parked semitrailers loaded with merchandise is lucrative business for thieves and costly for the owners of the merchandise.

Short of parking loaded semitrailers in guarded, impenetrable compounds, the best theft deterrent thus far devised has been a locking mechanism for the king pin of the trailer which prevents the pin from being engaged by the fifth wheel mechanism on a tractor. And, several inventors have devised locking mechanisms for this purpose.

Representative king pin locking mechanisms are disclosed in U.S. Pat. Nos. 3,798,938, granted Mar. 26, 1974, to R. G. McCullum, for "ARMORED LOCK MECHANISM", 3,922,897, granted Dec. 2, 1975, to T. J. Mickelson for "SEMITRAILER KING PIN SECURING DEVICE", and 4,697,444, granted Oct. 6, 1987, to C. O. Maffey for "SECURITY DEVICE FOR TRAILER".

Unfortunately, a sophisticated thief or team of thieves can, given sufficient time, defeat these prior locking mechanisms. The attack on the locking mechanism may involve one or more of the following techniques: drilling; punching; embrittlement by cryogenic treatment; cutting with oxyacetylene torch, an abrasive wheel, a band saw, or a hydraulic splitter; ballistic destruction; and cylinder lock manipulation. In most attacks, the objective is to disable or destroy the key actuated cylinder lock to permit the locking mechanism to be released from the semitrailer king pin. Each of the McCullum, Mickelson and Maffey locking mechanisms can be disabled in this manner.

Another theft technique is to equip the tractor with a modified fifth wheel mechanism that includes a clamp for grasping the housing for the locking mechanism so that the trailer can be hauled away with the locking mechanism still in place. Neither McCullum, Mickelson or Maffey offers a solution to this type theft. There continues to be a need for a reliable king pin locking mechanism capable of thwarting these various attack techniques.

DISCLOSURE OF THE INVENTION

In accordance with this invention, the king pin locking mechanism is controlled by a conventional key actuated cylinder lock. Rotational movement of a key in the lock cylinder is transmitted via a cam to at least one dead bolt which is capable of holding a locking bar in contact with the king pin. The mechanism for transmitting motion to the dead bolt cam includes a member which is deformed by tampering forces applied to the locking mechanism, such as forces applied to destroy the cylinder lock. When so deformed, this deformable member locks the dead bolt cam against rotation relative to the dead bolt. This deformable member acts as a secondary lock or "relock" for the dead bolt, preventing removal of the locking structure even if the cylinder lock is destroyed and removed.

Thus, a potential thief, having spent considerable time and effort to disable the key cylinder lock only to find that the locking mechanism remains locked, i.e., "relocked", likely will, in frustration, give up the theft attempt.

This invention further contemplates that the locking mechanism may incorporate additional features for thwarting attacks on the mechanism. One such feature is incorporation at strategic locations in the walls of the mechanism reinforcements in the form of pieces of hard, drill-resistant metal, such as tungsten carbide. Another feature involves corrugations on the surface of interior components. A drill penetrating the outer walls of the mechanism housing will be deflected and broken by the corrugations. A further such feature involves altering the surface configurations of the locking mechanism housing from one unit to the next. Such alterations prevent the design of a standard grabbing tool by the thief who wants to make off with the trailer with the locking mechanism intact on the king pin.

BRIEF DESCRIPTION OF THE DRAWINGS

The invention is described in greater detail hereinafter by reference to the accompanying drawings, wherein:

FIG. 3 is an exploded perspective view of the locking mechanism;

FIGS. 4–7 are front, back, top and end views of a dead bolt employed in the locking mechanism;

BEST MODE FOR CARRYING OUT THE INVENTION

Figure 1:
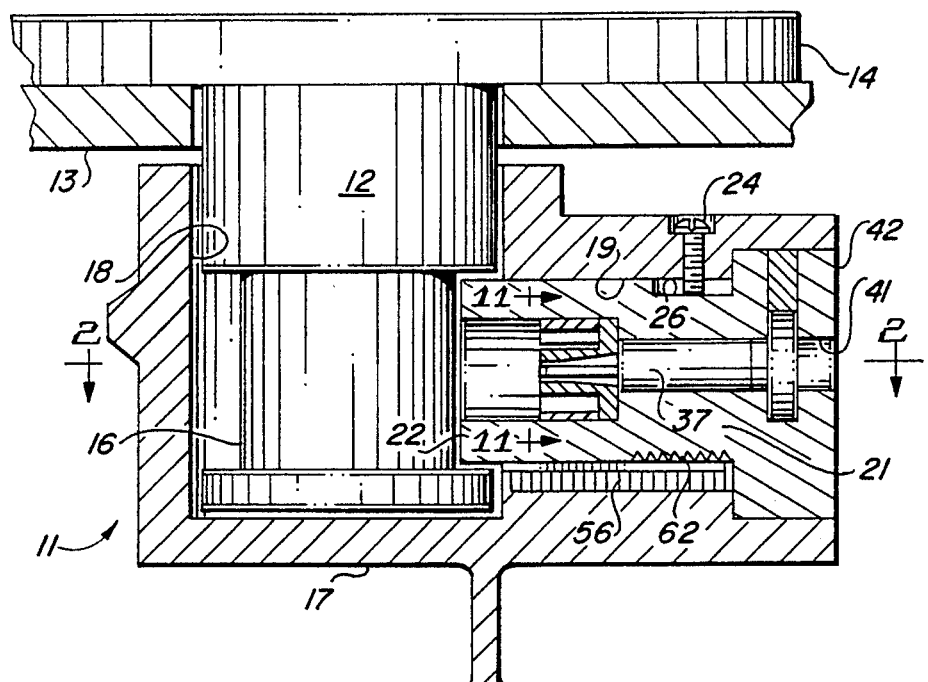
FIG. 1 is a vertical sectional view through the king pin locking mechanism of this invention, locked in place on the king pin of a semitrailer.
Figure 2:
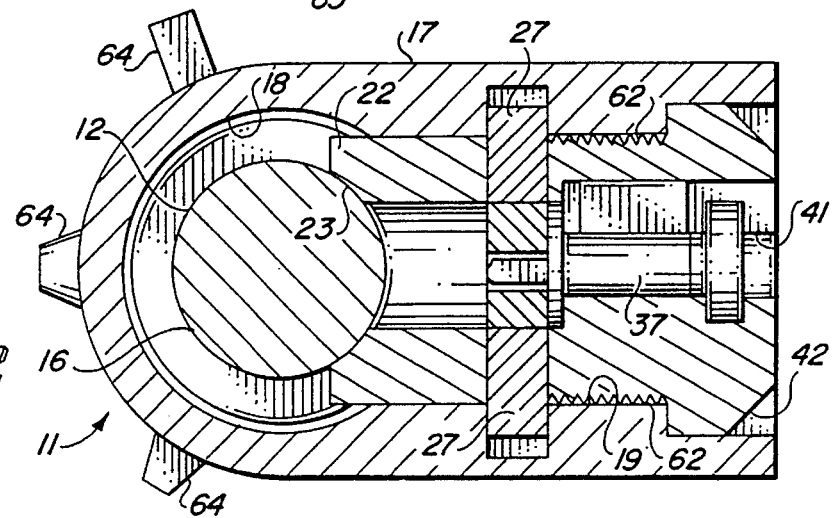
FIG. 2 is a horizontal sectional view of the locking mechanism, taking as indicated by line 2—2 in FIG. 1.

Referring particularly to FIGS. 1 and 2, the numeral 11 designates generally a king pin locking mechanism embodying the invention. The mechanism 11 is adapted to be locked onto the king pin 12 which projects downwardly from the bolster plate 13 on the underside of a semitrailer body 14. A typical king pin 12 has a reduced diameter section 16 which is utilized in latching the king pin into the fifth wheel mechanism (not shown) of a tractor. This reduced diameter section 16 of the king pin is also utilized to hold the locking mechanism 11 on the king pin as a theft deterrent. With the locking mechanism 11 in place on the king pin 12, it is impossible to insert the king pin into a fifth wheel mechanism to tow the semitrailer behind a tractor.

The several components of the king pin locking mechanism 11 are shown in exploded view FIG. 3 as well as in FIGS. 1 and 2. This mechanism includes a housing 17 having a vertical bore 18 therein for receiving king pin 12. Housing 17 also has a longitudinally extending chamber 19 therein which has one end in open communication with the vertical bore 18 and its opposite end open to the exterior of the housing to receive a locking bar 21. Locking bar 21 is slidably received in chamber 19 and has a king pin contact member 22 at one end thereof. Contact member 22 has an arcuate engagement surface 23 shaped to conform to the surface of the reduced diameter section 16 of king pin 12.

When locking bar 21 is inserted fully into chamber 19 of housing 17, king pin contact member 22 on the end of the bar enters the reduced diameter section 16 of king pin 12, preventing separation of the king pin and the locking mechanism 17. This is the condition illustrated in FIGS. 1 and 2. The locking mechanism 11 is locked onto the king pin 12.

On the other hand, if the locking bar 21 is moved away from the king pin 12 (to the right as viewed in FIGS. 1 and 2) so that the king pin contact member 22 is clear of the larger diameter regions of the king pin, the locking mechanism can be removed from the king pin. If desired, the range of sliding movement of the locking pin 21 can be limited by a threaded pin 24 extending through the top wall of housing 17 into a groove 26 provided on the top surface of locking bar 21.

Locking bar 21 is held in locked position in contact with king pin 12 by a pair of retractable dead bolts 27. Although the locking mechanism 11 could be fully functional with a single dead bolt 27, the balance of forces associated with an opposed pair of dead bolts reduces wear in the mechanism and provides for more reliable operation.

Figure 11:
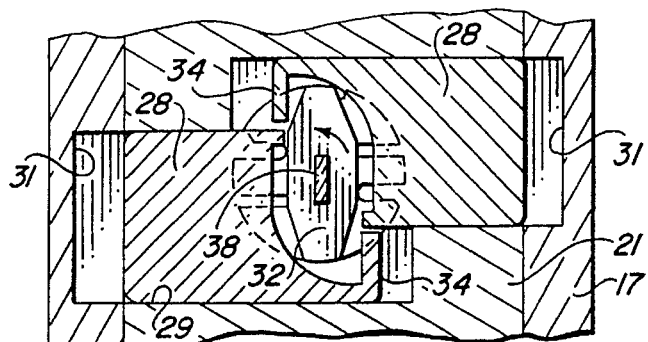
FIGS. 11 and 12 are partial vertical sectional views taken generally as indicated by line 11—11 in FIG. 1.

The two dead bolts 27 are identical and are shown in detail in FIGS. 4–7. Each dead bolt comprises an elongated rectangular body 28 sized to slidably rest within transverse guide passages 29 in the side walls of locking bar 21. When retracted, dead bolts 27 reside entirely within the locking bar, permitting it to slide within housing 17 (see FIG. 11). However, with locking bar in position to engage the king pin 12, dead bolts 27 are movable outwardly of the locking bar 21 into strike recesses 31 in the side walls of housing 17 (see FIG. 12).

Figure 12:
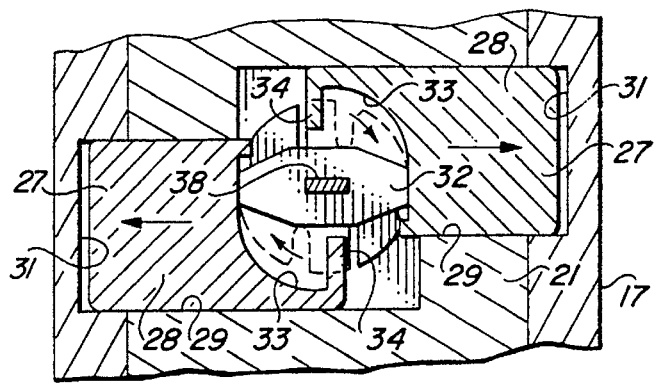
Figure 16:
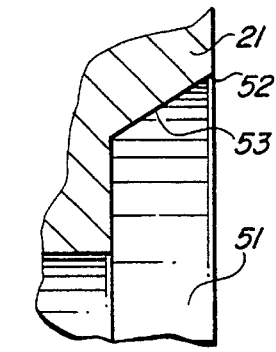
FIG. 16 is an enlarged, fragmentary sectional view of the locking bar taken as indicated by line 16—16 in FIG. 15.

Movement of dead bolts 27 is effected by a double-acting, rotatable cam 32 acting against cam surfaces 33 and cam follower 34 cast onto the inner ends of the dead bolts 27. As can be seen by comparing FIGS. 11 and 12, counterclockwise rotation of cam 32 causes the cam to contact follower 34 to retract the dead bolts (FIG. 11), whereas clockwise rotation of cam 32 causes the cam to contact cam surfaces 33 to deploy, or extend, dead bolts 27 (FIG. 12).

Rotation of cam 32 is effected by means of a key 36 inserted into a cylinder lock 34 having a spindle 38 extending into a central opening 39 in the cam. Key access to cylinder lock 37 is through an opening 41 in face cap 42 at the outer end of the locking bar 21.

One common approach to disabling and defeating a king pin locking mechanism 11 of the type disclosed here is to drill or punch out the cylinder lock 37 through opening 41 in the locking bar face cap 42. Another approach would be to drill through the bottom wall of the mechanism housing 17 to probe the cam 32 and cause it to turn and twist off spindle 38 of the cylinder lock 37. This invention provides a mechanism for thwarting both of these approaches. This mechanism responds to tampering and relocks dead bolts 27 against release from strike recesses 31, providing a further obstacle to removal of the king pin locking mechanism 11.

Figures 8, 9, 10:
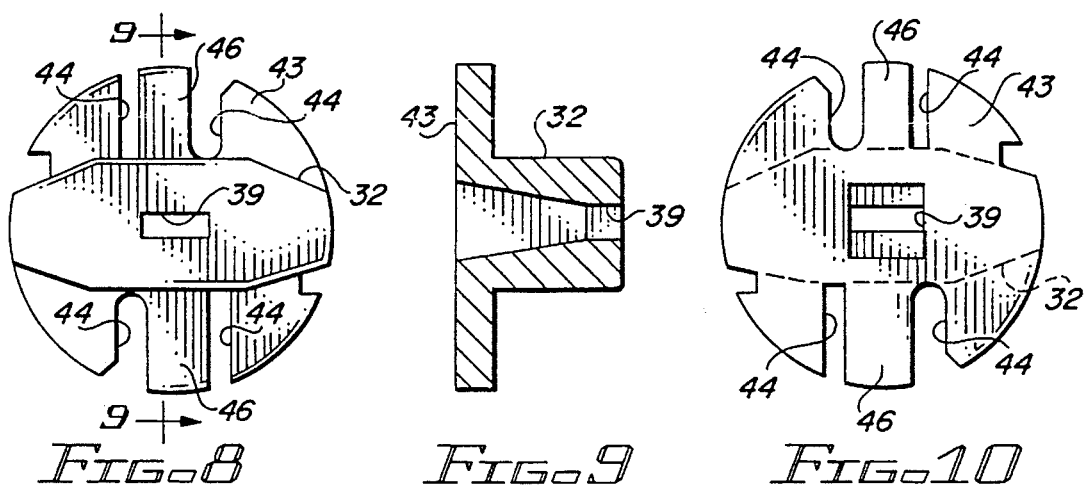
FIGS. 8–10 are views of a combination cam and deformable disc employed in the locking mechanism, FIG. 9 being a sectional view taken as indicated by line 9—9 in FIG. 8.
Figure 14:
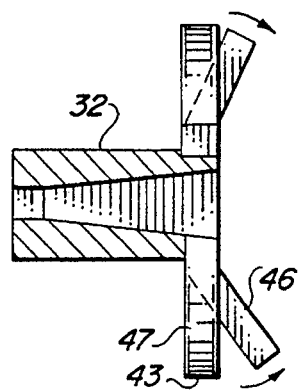
FIG. 14 is a sectional view through the combination cam and deformable disc in the condition illustrated in FIG. 13.
Figure 13:
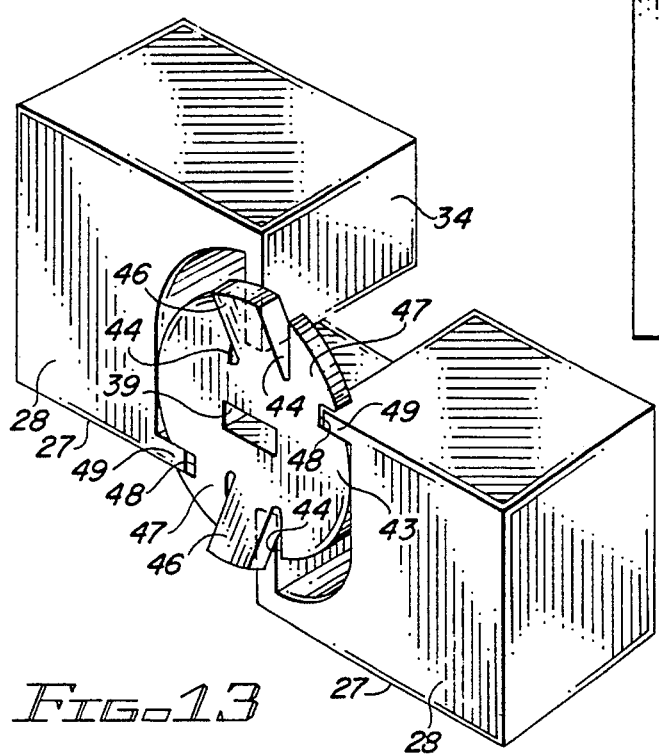
FIG. 13 is an enlarged, perspective view of a dead bolt actuating mechanism employed in the locking mechanism and illustrating a relocking feature of the invention.

The relocking mechanism comprises a deformable disc 43 cast on one end face of cam 32 (see FIGS. 8–10). Disc 43 has cutouts 44 provided therein to leave oppositely extending radial tabs 46. So long as disc 43 remains undeformed—the condition illustrated in FIGS. 8–10—the disc lies on the end surface of cam followers 34 on each dead bolt 27. In other words, the disc 43 and cam 32 to which it is affixed can rotate freely with respect to the dead bolts 27 to cause the dead bolts to move in and out of the locking bar 21. However, if the tabs 46, or one of these tabs, is deformed in the manner illustrated in FIGS. 13 and 14, locking portions 47 enter the path of travel of the dead bolts 27 and notches 48 on the periphery of the disc receive projections 49 on the inner ends of the dead bolts 27, thereby locking the cam 32 against rotation and locking the dead bolts in their extended position. This "relocked" condition is illustrated in FIG. 13.

This relocked condition can be induced by the two different tampering, or disabling, approaches mentioned above. If a thief is attempting to drill out or punch out the cylinder lock 37 from the end of the locking bar 21, the longitudinal forces applied to the cylinder lock will drive the deformable disc 43 against the inner ends of the dead bolts 27. With the dead bolts in their locked position (FIGS. 12 and 13), the tabs 46 on the deformable disc are lined up with the ends of the cam followers 34 on the dead bolts. That force deforms the tabs 46 on the disc, allowing the locking portions 47 of the disc to enter the path of movement of the dead bolts, locking them in their extended positions.

Figure 15:
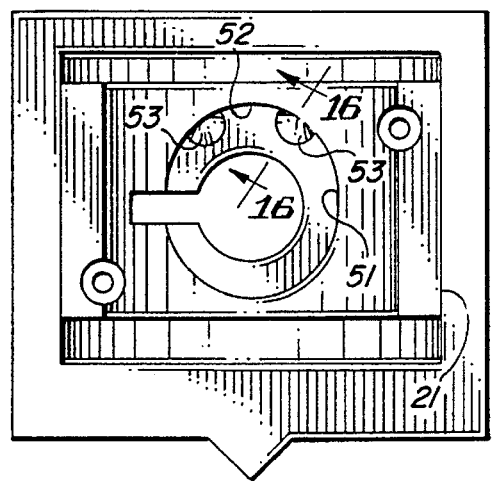
FIG. 15 is an end view of a locking bar employed in the mechanism with internal components removed.

The relocked condition can also be induced by a thief drilling through the bottom of the mechanism housing 17 and probing the dead bolt actuating mechanism. Such activity lifts cam 32 and deformable disc 43 from its normal position resting on the floor of the cylindrical cavity 51 which houses the cam 32 and disc 43. As can be seen in FIG. 15, cavity 51 has an elevated roof portion 52 which allows disc 43 to move upward a short distance if an upward force is applied to the disc or the cam 32 to which the disc is attached. This elevated roof portion 52 of the cavity 51 has a pair of cam-like protuberances 53 formed therein within the path of upward movement of the disc 43. When the disc 43 contacts the cam-like protuberances, a locking portion 47 of the disc is forced into the path of travel of one of the dead bolts 27. This, again, is permitted by deformation of the tab 46 on the disc. And, again, the notch 48 on the upper locking portion 47 of the disc 43 receives projection 49 on one of the dead bolts 27, relocking the dead bolt mechanism in its locked position.

This relocked condition which the potential thief encounters only after having spent considerable effort to reach the interior of the king pin locking mechanism 11 is sufficient further deterrent to discourage him or her from continuing to attack the king pin locking mechanism.

The king pin locking mechanism 11 is also preferably equipped with certain additional features designed to discourage tampering with the mechanism.

One such feature is a row of barrier pieces 56 disposed in an elongated slot 54 down the middle of the bottom wall of the housing. These barrier pieces 56 are formed of a very hard, drill-resistant material, such as tungsten carbide. Further, these barrier pieces possess a polyhedral shape, preferably triangular in cross section, with the apexes pointing downwardly. The barrier pieces 56 not only act to deflect and break drill bits employed to drill through the housing 17, but are very effective to defeat abrasive saw blades attacking the housing.

A further deterrent feature includes a barrier disc 58 disposed in a slot 59 behind the opening 41 in locking bar face cap and in front of the cylinder lock 37. Barrier disc 58 preferably has strips 59 of tungsten carbide embedded therein for discouraging drilling through the disc. As a further deterrent, another barrier piece 61 may be positioned in front of and at the periphery of barrier disc 58 to discourage routing out the barrier disc.

A still further deterrent feature which may optionally be incorporated into the king pin locking mechanism 11 is to provide angled corrugations, or ribs, 62 on the side and bottom surfaces of the locking bar 21. Such corrugations also have the effect of deflecting and breaking a drill bit drilling through the housing 17 into the locking bar.

If desired, the housing 17 of the locking mechanism may have a handle 63 cast into its bottom surface. The handle facilitates carrying the king pin locking mechanism 11 and also hinders attempts to drill or saw through the bottom wall of the housing.

Lastly, the housing 17 in a series of king pin locking mechanisms may have cast on the exterior surfaces thereof different size, shape and location protuberances 64. With the exterior surface configuration of each king pin locking mechanism different, thieves are discouraged from attempting to design a grappling device for towing the semitrailer away with the locking mechanism in place.

What is claimed is:

1. A king pin locking mechanism comprising a housing having a king pin receiving bore therein, said housing having a longitudinally extending chamber therein having one end in open communication with said receiving bore and the opposite end open to the exterior of the housing, said chamber having a dead bolt receiving recess in at least one wall thereof, a locking bar slidably received in said chamber, said locking bar having a king pin contact member at one end thereof and engageable with a king pin positioned in said bore when said locking bar is in a locked position, said locking bar being movable to an unlocked position in which said king pin contact member is disengaged from the king pin, at least one dead bolt carried by said locking bar, said dead bolt being retractable into said locking bar to permit movement of the locking bar in the housing chamber, said dead bolt being movable into the recess in the chamber wall when the locking bar is in its locked position, a cylinder lock positioned in said locking bar and accessible from outside the locking bar, a dead bolt cam rotatable in said locking bar for moving said dead bolt, means connecting said cylinder lock and said cam for rotating said cam in response to rotation of a key in said cylinder lock, and a deformable member associated with said cam, said deformable member, when undeformed, permitting free rotation of said dead bolt cam in relation to said dead bolt, said deformable member being deformed in response to unauthorized tampering with the locking mechanism and when deformed, preventing rotation of said cam in relation to said dead bolt.

2. The locking mechanism of claim 1, further comprising a guard disc rotatably positioned in said locking bar between said cylinder lock and the exterior of said locking bar, said guard disc having a key slot therein aligned with said cylinder lock, said guard disc having hard drill-resistent materials incorporated therein.

* * * * *